United States Patent [19]

Steiert et al.

[11] Patent Number: 5,015,681

[45] Date of Patent: May 14, 1991

[54] FLAMEPROOF THERMOPLASTIC MOLDING MATERIALS BASED ON POLYAMIDES AND POLYESTER ELASTOMERS

[75] Inventors: Peter Steiert; Walter Betz, both of Ludwigshafen; Christoph Plachetta, Limburgerhof; Eckhard M. Koch, Fussgoenheim, all of Fed. Rep. of Germany

[73] Assignee: BASF Aktiengesellschaft, Ludwigshafen, Fed. Rep. of Germany

[21] Appl. No.: 442,549

[22] Filed: Nov. 28, 1989

[30] Foreign Application Priority Data

Dec. 29, 1988 [DE] Fed. Rep. of Germany ....... 3844228

[51] Int. Cl.$^5$ ............................................ C08K 5/3492
[52] U.S. Cl. ..................................... 524/101; 524/538
[58] Field of Search ................................ 524/101, 538

[56] References Cited

U.S. PATENT DOCUMENTS

| | | | |
|---|---|---|---|
| 4,180,496 | 12/1979 | Yanagimoto et al. | 526/6 |
| 4,439,578 | 3/1984 | Kim et al. | 524/538 |
| 4,874,800 | 10/1989 | Minamisawa et al. | 524/538 |

FOREIGN PATENT DOCUMENTS

| | | |
|---|---|---|
| 2740092 | 3/1978 | Fed. Rep. of Germany. |
| 2937379 | 4/1980 | Fed. Rep. of Germany. |
| 3208486 | 9/1982 | Fed. Rep. of Germany. |

*Primary Examiner*—Kriellion Morgan
*Attorney, Agent, or Firm*—Oblon, Spivak, McClelland, Maier & Neustadt

[57] ABSTRACT

Thermoplastic molding materials contain, as essential components,
(A) from 40 to 99.55% by weight of a thermoplastic polyamide,
(B) from 0.45 to 15% by weight of a thermoplastic polyester elastomer,
(C) from 0.05 to 1.99% by weight of melamine cyanurate and in addition
(D) from 0 to 50% by weight of fibrous or particulate fillers or a mixture thereof.

5 Claims, No Drawings

FLAMEPROOF THERMOPLASTIC MOLDING MATERIALS BASED ON POLYAMIDES AND POLYESTER ELASTOMERS

The present invention relates to thermoplastic molding materials containing, as essential components, (A) from 40 to 99.55% by weight of a thermoplastic polyamide,
(B) from 0.45 to 15% by weight of a thermoplastic polyester elastomer,
(C) from 0.05 to 1.99% by weight of melamine cyanurate and in addition
(D) from 0 to 50% by weight of fibrous or particulate fillers or a mixture thereof.

The present invention furthermore relates to the use of such molding materials for the production of moldings, and moldings which are obtainable using these molding materials as essential components.

The earlier Patent Application 38 06 271.2, without prior publication, discloses that polyamide molding materials mixed with not more than 15% by weight of polyester elastomers have a good overall spectrum of mechanical properties; in spite of the use of the polyester elastomer, moldings of these molding materials have excellent rigidity and impact strength at low temperatures and good flow.

The use of the flameproofing agent melamine cyanurate in polyamide molding materials is disclosed, inter alia, in DE-A 27 40 092 and DE-A 29 37 379. However, the use of this flameproofing agent is not without problems. If the amount of the melamine cyanurate is too large, the mechanical properties are adversely affected. Melamine sublimes during the shaping process and thus forms deposits in the mold. Another disadvantage is the blooming of this flameproofing agent.

If the amount of melamine cyanurate is too small, the flameproofing effects are unsatisfactory.

Thus, DE-A 29 37 379 advises against an amount of less than 2% by weight of melamine cyanurate in the polyamide molding material; in the case of fibers, the recommended minimum amount of flameproofing additive is as high as 3%. Similar recommendations are also disclosed in DE-A 27 40 092.

Corresponding examples have a flame retardance (flammability) according to UL-94 of V-2, with a very long combustion time.

It is an object of the present invention to provide thermoplastic molding materials which have good overall spectrum of mechanical properties and the flameproofing properties necessary for their intended uses.

We have found that this object is achieved, according to the invention, by the thermoplastic molding materials defined at the outset.

Preferred materials of this type and their use are described in the subclaims.

The polyamides present as component (A) in the materials are known per se and include the semicrystalline and amorphous resins having weight average molecular weights of not less than 5,000, the said resins usually being referred to as nylon. Such polyamides are described in, for example, U.S. Pat. Nos. 2,071,250, 2,071,251, 2,130,523, 2,130,948, 2,241,322, 2,312,966, 2,512,606 and 3,393,210.

The polyamides can be prepared, for example, by condensation of equimolar amounts of a saturated or aromatic dicarboxylic acid of 4 to 12 carbon atoms with a diamine of 14 carbon atoms, or by condensation of ω-aminocarboxylic acids or polyaddition of lactams.

Examples of polyamides are polyhexamethyleneadipamide (nylon 66), polyhexamethyleneazelaamide (nylon 69), polyhexamethylenesebacamide (nylon 610), polyhexamethylenedodecanediamide (nylon 612), the polyamides obtained by ring cleavage of lactams, such as polycaprolactam and polylaurolactam, as well as poly-11-aminocyclohexyl)-methane- and dodecanedioic acid.

It is also possible, according to the invention, to use polyamides which have been prepared by copolycondensation of two or more of the abovementioned polymers or their components, for example copolymers of adipic acid, isophthalic acid or terephthalic acid and hexamethylenediamine, or copolymers of caprolactam, terephthalic acid and hexamethylenediamine. Linear polyamides having a melting point above 200° C. are preferred.

Preferred polyamides are polyhexamethyleneadipamide, polyhexamethylenesebacamide and polycaprolactam. The polyamides generally have a relative viscosity of from 2.5 to 5, determined in 1% strength by weight solution in 96% strength sulfuric acid at 23° C., which corresponds to a molecular weight of about 15,000–45,000. Polyamides having a relative viscosity of from 2.5 to 3.5, in particular from 2.6 to 3.4, are preferably used.

Other polyamides which may be mentioned are those which are obtainable, for example, by condensation of 1,4-diaminobutane with adipic acid at elevated temperatures (nylon 46). Preparation processes for polyamides having this structure are described in, for example, EP-A 38 094, EP-A 38 582 and EP-A 39 524.

The amount of the polyamides (A) in the novel molding materials is from 40 to 99.5, preferably from 50 to 99, in particular from 60 to 98, % by weight.

The novel thermoplastic molding materials contain, as component (B), from 0.45 to 15, in particular from 1 to 12, and particularly preferably from 1 to 5, % by weight, based on the total weight of the molding materials, of a thermoplastic polyester elastomer.

Polyester elastomers are segmented copolyetheresters which contain long-chain and short-chain segments. Long-chain segments are derived, as a rule, from polyalkyleneetherdiols and the short-chain segments from low molecular weight diols and dicarboxylic acids.

Products of this type are known per se and are described in the literature. Merely by way of example, reference may be made here to U.S. Pat. Nos. 3,651,014, 3,784,520, 4,185,003 and 4,136,090, and to the publications by G. K. Hoeschele in Chimia 28 (9) (1974), 544, Angew, Makromolek. Chemie 58/59 (1977), 299–319, and Pol. Eng. Sci. 1974, 848. Appropriate products are also available commercially under the names Hytrel ® (DuPont), Arnitel ® (Akzo) and Pelprene ® (Toyobo Co. Ltd.).

Very generally, thermoplastic copolyetherester elastomers are composed of long-chain segments of the general formula

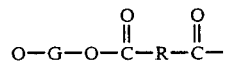

and short-chain segments of the general formula

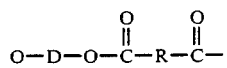

where G is a divalent radical which is formed after removal of the terminal hydroxyl groups from a polyalkyleneetherdiol having a molecular weight of, preferably, from 400 to 6,000, in particular from 600 to 4,000, D is a divalent radical which is formed after removal of the terminal hydroxyl groups from a low molecular weight diol having a molecular weight of, preferably, less than 250, and R is a divalent radical which is formed after removal of the carboxyl groups from a dicarboxylic acid having a molecular weight of, preferably, less than 300.

It is of course also possible to use mixtures of several polyalkyleneetherdiols, several diols or several dicarboxylic acids.

The polyalkyleneetherdiols HO—G—OH preferably have a melting point of less than 55° C. and a carbon-/oxygen molar ratio of, preferably, from 2 to 10, in particular from 2 to 6.

Examples of polyalkyleneetherdiols are poly(ethylene oxide) glycol, poly(1,2-propylene oxide) glycol, poly(1,3-propylene oxide) glycol, poly(1,2-butylene oxide) glycol, poly(1,3-butylene oxide) glycol, poly(1,4-butylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and random or block copolymers of different glycols from among those mentioned above. Poly(ethylene oxide) glycol, poly (1,2-propylene oxide) glycol, poly(1,3-propylene oxide) glycol and poly(1,4-butylene oxide) glycol and mixtures thereof are preferred. The amount by weight of the long-chain segments, which are derived from the above polyalkylene oxide glycols and dicarboxylic acids, is in general from 5 to 70, preferably from 7 to 50, % by weight, based on the total weight of component B.

Suitable diols HO—D—OH are very generally low molecular weight diols having molecular weights of, preferably, less than 250. These may have linear or branched, cycloaliphatic or aromatic parent structures.

Diols of 2 to 15 carbon atoms are preferred. 1,2-Ethanediol, 1,3-propanediol, 1,2-propanediol, 1,4-butanediol, 1,3-butanediol, 1,2-butanediol, 1,5-pentanediol, 2,2-dimethyl-1,3-propanediol, 1,6-hexamediol and its isomers, decamethylenediol, the isomeric dihydroxycyclohexanes, resorcinol, hydroquinone and the various dihydroxynaphthalenes may be mentioned here merely by way of example. Aliphatic diols of 2 to 8, in particular 2 to 4, carbon atoms, such as 1,2-ethanediol, 1,3-propanediol and 1,4-butanediol, are particularly preferred.

Unsaturated diols have also been found to be suitable in some cases, for example but-2-ene-1,4-diol, particularly as a mixture with the abovementioned saturated diols. Examples of polyetheresters obtained from such mixtures are described in EP-A 49 823.

Other suitable diols are diphenols, such as 4,4-dihydroxybiphenyl, di-(4-hydroxyphenyl)-methane and 2,2-di-(4-hydroxyphenyl)-propane (frequently referred to as bisphenol A).

Instead of the diols, it is of course also possible to use their ester-forming derivatives, for example the esters of readily volatile carboxylic acids.

The dicarboxylic acids having the structural unit HOOC—R—COOH preferably having molecular weight of less than 300 and may be aromatic, aliphatic or cycloaliphatic. The dicarboxylic acids can also have substituents which do not interfere in the course of the polymerization reaction.

Examples of aromatic dicarboxylic acids are terephthalic acid, isophthalic acid, substituted dicarboxylic acids of the general formula

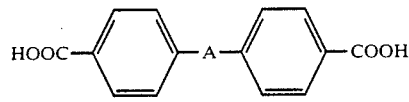

where A is a chemical bond, alkylene of 1 to 3 carbon atoms, —CO—, —S— or —SO$_2$—, 1,5—, 2,6— and 2,7-naphthalenedicarboxylic acid and its C$_1$-C$_6$-alkyl-substituted derivatives. Among these, terephthalic acid and isophthalic acid, mixtures thereof or mixtures of terephthalic or isophthalic acid with other dicarboxylic acids are preferred.

Aliphatic dicarboxylic acids which may be used are, for example, oxalic acid, fumaric acid, maleic acid, citraconic acid, sebacic acid, adipic acid, glutaric acid, succinic acid and azelaic acid.

It is of course also possible to use mixtures of different aliphatic dicarboxylic acids. As in the case of the diols, instead of the acids themselves it is also possible to use ester-forming derivatives thereof. In some cases, this has also been found to be particularly advantageous.

With regard to further long-chain glycols HO—G—OH, short-chain diols HO—D—OH and dicarboxylic acids HOOC—R—COOH, reference may be made to U.S. Pat. No. 3 651 014.

As mentioned above, the amount of the long-chain segments is in general from 5 to 70, preferably from 7 to 50, % by weight and the amount of the short-chain segments is correspondingly from 30 to 95, preferably from 50 to 93, % by weight. The amount by weight of the particular segments influences, inter alia, the hardness of the products.

The dicarboxylic acids in the long-chain and short-chain segments may be identical or different; likewise, mixtures of diols or dicarboxylic acids may be used in the preparation of the long-chain or short-chain segments.

The above statements show that a large number of different segmented copolyetheresters can be used as component (B). Among these, copolyetheresters whose long-chain units are derived from poly(1,4-alkylene oxide) glycols having a molecular weight of from 600 to 2,000, terephthalic acid and 1,4-butanediol are preferred.

In some cases, it has proven advantageous to replace some of the terephthalic acid by isophthalic acid, adipic acid or sebacic acid, or some of the 1,4-butanediol by other diols, e.g. 1,3-propanediol, 1,5-pentanediol or but-2-ene-1,4-diol. Products of this type are described in U.S. Pat. No. 3,651,014 and EP-A 49 823.

Processes for the preparation of segmented copolyetheresters are known per se and are described in the literature, so that further information is unnecessary here. It is merely necessary here to refer to U.S. Pat. No. 3,651,014, U.S. Pat. No. 3,784,520 and a review article by G. K. Hoeschele (Chimia 28 (1974), 544).

The copolyetheresters (B) may contain stabilizers to effect stabilization against thermal or oxidative decomposition, as described in, for example, U.S. Pat. Nos. 4,136,090 and 4,185,003 and an articles by G. K. Hoeschele (Angew. Makromolek. Chemie 58/59 (1977), 299–319).

In addition to the components (A) and (B), the novel thermoplastic molding materials contain from 0.05 to 1.99, preferably from 0.2 to 1.99, % by weight, of melamine cyanurate as a flameproofing agent.

The melamine cyanurate used according to the invention (component (C)) is a reaction product of, preferably equimolar amounts of melamine (formula I) and cyanuric acid or isocyanuric acid (formulae IIa and IIb)

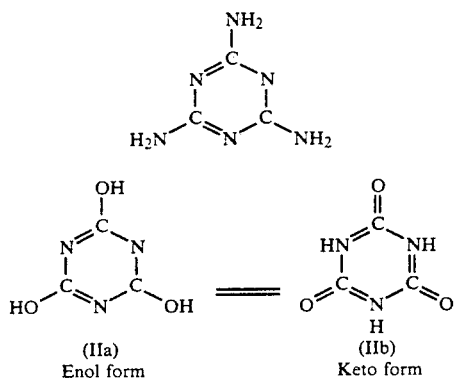

(IIa) Enol form   (IIb) Keto form

It is obtained, for example, by reacting aqueous solutions of the starting compounds at from 90° to 100° C. The commercially available product is a white powder having a median particle size $d_{50}$ of 69 μm.

In addition to components (A), (B) and (C), the novel thermoplastic molding materials may contain conventional additives and processing assistants, such as stabilizers, antioxidants, heat stabilizers and UV stabilizers, lubricants and mold release agents, colorants, such as dyes and pigments, fibrous and pulverulent fillers and reinforcing agents, nucleating agents, plasticizers, etc., the amount of which as a rule is not more than 50% by weight, based on the total weight of the molding materials.

The stabilizers can be added to the thermoplastic molding materials at any stage of the preparation, but are preferably added at as early a stage as possible, to prevent decomposition from beginning before the stabilizer has been incorporated. Examples of antioxidants and heat stabilizers are halides of metals of group I of the Periodic Table, for example sodium halides, potassium halides and/or lithium halides, if necessary in combination with copper(I) halides, for example chlorides, bromides or iodides, sterically hindered phenols, hydroquinones, various substituted members of these groups and mixtures thereof, in concentrations of not more than 1% by weight, based on the weight of the thermoplastic molding material.

Examples of UV stabilizers, which are generally used in amounts of not more than 2% by weight, based on the molding material, are various substituted resorcinols, salicylates, benzotriazoles and benzophenones.

Lubricants and mold release agents are added, as a rule, in amounts of not more than 1% by weight, based on the total weight of the molding material. Examples of these are stearic acid, stearyl alcohol and stearamides.

It is also possible to add organic dyes, such as nigrosine, pigments, such as titanium dioxide, cadmium sulfide, cadmium selenide, phthalocyanines, ultramarine blue and carbon black, as colorants, and fibrous and pulverulent fillers and reinforcing agents. Examples of the latter are carbon fibers, glass fibers, amorphous silica, asbestos, calcium silicate, aluminum silicate, magnesium carbonate, kaolin, chalk, powdered quartz, mica and feldspar. The amount of such fillers and colorants is in general not more than 50% by weight, based on the total weight of the molding materials.

The nucleating agents used may be, for example, talc, calcium fluoride, sodium phenylphosphinate, alumina and finely divided polytetrafluoroethylene.

Examples of plasticizers are dioctyl phthalate, dibenzyl phthalate, butylbenzyl phthalate, hydrocarbon oils, N-(n-butyl)-benzenesulfonamide and o- and p-tolylethylsulfonamide.

The novel molding materials can be prepared by conventional processes, for example by mixing in the melt at elevated temperatures. Advantageously, extruders, for example single-screw or twin-screw extruders, or other conventional plasticizing apparatuses, such as Brabender mills or Banbury mills, are used for this purpose. The preparation can, however, also be carried out by coprecipitating the components from a solution or by mixing or dry blending the components and then extruding a melt of the dry mixture.

A preferred embodiment comprises incorporating the melamine cyanurate into the polyamide by the batch method. For this purpose, a masterbatch of 20% by weight of melamine cyanurate and 80% by weight of the polyamide is generally prepared and is diluted in accordance with the amounts by weight, according to the invention, of components (A) to (C) during secondary compounding (incorporation of polyester elastomers and, if required, further additives).

The novel molding materials are suitable for processing by injection molding or extrusion, in particular for the production of heat-stable moldings for all industrial purposes, which have a high impact strength and are subjected to high stress.

In particular, the good impact strength in combination with good flow, good rigidity and effective flameproofing is particularly advantageous. The novel molding materials are especially suitable for cable binders or multipoint connectors.

EXAMPLE

Component A

Polyhexamethyleneadipamide having a relative viscosity (1 g/100 ml in 96% strength $H_2SO_4$ at 25° C.) of 2.6 (Ultramid ® A3 from BASF AG)

Component B

Hytrel ® 4056 (copolyetherester essentially composed of units derived from poly(1,4-butylene glycol), terephthalic acid and 1,4-butanediol), having a Shore hardness of 92 A or 40 D (according to ASTM D-2240) and a melt flow index of from 4 to 6.5 g/10 min (190° C., 2.16 kg load) (manufacturer: DuPont de Nemours and Company)

Component C

Melamine cyanurate (from SKW-Trostberg) having a particle size ($d_{50}$) of 69 μm A mixture of 97.1% by weight of Ultramid ® A3 and 2% by weight of Hytrel ® 4056 and 0.9% by weight of melamine cyanurate was mixed and melted at 280° C. in a twin-screw extruder and then extruded into a water bath. After granulation and drying, the mixtures were molded in an injection molding machine to give round disks having a diameter of 60 mm and a thickness of 2 mm. The falling dart test according to DIN 53,443, 1st Part, was carried out on rectangular moldings measuring 120 mm×40 mm and having a thickness of 1.5 mm.

The IZOD notched impact strength according to ISO 180 and ASTM D 256 and the total combustion time according to UL-94 (rectangular bars measuring 127 mm×12.7 mm and having a thickness of 3.2 mm) were measured.

| Composition of the molding materials [% by weight] | | | | | | IZOD notched impact strength (23° C., ISO 180) [J/m] | Falling dart test, DIN 53,443 damaging energy $W_{50}$ [N.m], 23° C. | Total combustion time UL 94 (3.2 mm) [sec] |
|---|---|---|---|---|---|---|---|---|
| 92 | (A) | 0 | (B) | 8 | (C) | 40 | 20 | 10 |
| 97.1 | (A) | 2 | (B) | 0.9 | (C) | 53 | 100 | 20 |
| 98 | (A) | 2 | (B) | 0 | (C) | 55 | 100 | 200 |

We claim:
1. A flameproof thermoplastic molding material containing, as essential components,
    (A) from 40 to 99.55% by weight of a thermoplastic polyamide,
    (B) from 0.45 to 15% by weight of a thermoplastic polyester elastomer, and
    (C) from 0.05 to 1.99% by weight of melamine cyanurate and in addition
    (D) from 0 to 50% by weight of fibrous or particulate fillers or a mixture thereof.

2. A flameproof thermoplastic molding material as claimed in claim 1, containing, as essential components,
    (A) from 45 to 99.35% by weight of the thermoplastic polyamide,
    (B) from 0.45 to 10% by weight of the thermoplastic polyester elastomer, and
    (C) from 0.2 to 1.99% by weight of melamine cyanurate.

3. A thermoplastic molding material as claimed in claim 1, wherein component (B) is composed of units Ia and Ib

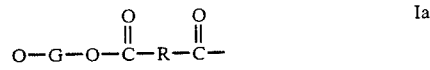

and

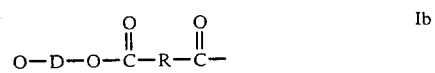

where G is a divalent radical of a polyalkyleneetherdiol, D is a divalent radical of a diol and R is a divalent radical of a dicarboxylic acid.

4. A flameproof thermoplastic molding material as claimed in claim 1, wherein the amount by weight of the long-chain segments Ia of component (B) is from 5 to 70% by weight and that of the short-chain segments Ib is from 30 to 95% by weight.

5. A molding obtained from a thermoplastic molding material as claimed in claim 1 as an essential component.

* * * * *